United States Patent [19]
Boehlke

[11] Patent Number: 5,966,184
[45] Date of Patent: Oct. 12, 1999

[54] VIDEO SYNCHRONIZING SIGNAL GENERATOR

[75] Inventor: Kenneth Alfred Boehlke, Beaverton, Oreg.

[73] Assignee: Focus Enhancements, Inc., Wilmington, Mass.

[21] Appl. No.: 08/823,804

[22] Filed: Mar. 24, 1997

[51] Int. Cl.⁶ .................................................. H04N 5/06
[52] U.S. Cl. ............................................. 348/524; 348/521
[58] Field of Search .................................. 348/521, 524, 348/522, 523, 530, 540, 549; H04N 5/06

[56] References Cited

U.S. PATENT DOCUMENTS

| | | | |
|---|---|---|---|
| 4,162,508 | 7/1979 | Tatami | ....................................... 358/18 |
| 4,169,659 | 10/1979 | Marlowe . | |
| 4,268,853 | 5/1981 | Nakamura et al. . | |
| 4,328,513 | 5/1982 | Furihato et al. . | |
| 4,390,892 | 6/1983 | Banks . | |
| 4,575,757 | 3/1986 | Aschwanden . | |
| 4,769,704 | 9/1988 | Hirai et al. | ............................... 358/148 |
| 4,975,767 | 12/1990 | Sorenson | ................................... 358/19 |
| 5,282,020 | 1/1994 | Tanaka . | |

FOREIGN PATENT DOCUMENTS

| | | | |
|---|---|---|---|
| 3212655 | 4/1981 | Germany | ......................... H04N 9/44 |
| 0189319 | 1/1986 | Japan | ................................ H03L 7/18 |

*Primary Examiner*—Chris Grant
*Attorney, Agent, or Firm*—Christopher P. Ricci

[57] ABSTRACT

A synchronizing signal generator produces a PAL standard horizontal synchronizing signal using a PAL standard subcarrier signal as a timing reference. The synchronizing signal period is not an even multiple of the subcarrier signal period. To produce the synchronizing (sync) signal, the generator first frequency multiplies and divides the input signal to produce a reference signal having a period that is a rational multiple of the subcarrier signal period but smaller than the desired sync signal period. The generator then delays each successive pulse of the reference signal by increasingly longer delay times to produce the sync signal.

16 Claims, 2 Drawing Sheets

VIDEO SYNCHRONIZING SIGNAL GENERATOR

BACKGROUND OF THE INVENTION

FIELD OF THE INVENTION

The present invention relates in general to video synchronizing signal generators, and in particular to a circuit for deriving an offset video synchronizing signal from a video subcarrier.

In the European Television Phase Alternate Line (PAL) standard, a video frame has 625 lines, with 1125 pixels per line. A frame is formed by two interleaved fields of 312.5 lines per field. A video source produces a video signal conveying the color information for each pixel of a frame in succession on a line-by-line basis with the two fields for each frame appearing in succession. A display monitor, may for example, use the video signal to control the intensity of an electron beam as it sweeps across a cathode ray tube screen. One of the signals needed by the video source or display monitor is a horizontal synchronizing (sync) signal H indicating the start of each line of pixel information as it appears in the subcarrier signal.

A horizontal sync signal generator typically uses the video signal subcarrier signal frequency $F_{sc}$ as a reference to produce a suitable horizontal synchronizing signal H. In the PAL standard, the period ($P_H$) of the horizontal synchronizing signal is related to the period $F_{SC}$ of the video subcarrier signal as follows:

$$P_H = (1135/4 + 1/625)P_{SC}.$$
$$= 1135 F_{SC}/4 + 1/(25 \text{ Hz})$$
$$= (709379/2500)P_{SC}.$$

Since $P_H$ is a large fractional multiple of $P_{SC}$ it is not practical to simply frequency multiply the SC signal by 2500 and then frequency divide it by 709379 to produce the horizontal sync signal H. Without the 25 Hz offset we could use a frequency multiplier to multiply the subcarrier signal SC by 4 and then use a simple divide-by-1135 counter to frequency divide the resulting $4F_{SC}$ to produce the horizontal synchronizing signal H. However accounting for the 25 Hz offset requires more sophisticated circuitry.

Phase lock loop technology can produce an output signal having a period that is not an even multiple of the period of a reference signal. U.S. Pat. No. 4,268,853 issued May 19, 1981 to Nakamura et al, U.S. Pat. No. 4,328,513 issued May 4, 1982 to Furigato et al, U.S. Pat. No. 4,390,892 issued Jun. 28, 1984 to Banks, and U.S. Pat. No. 4,575,757 issued Mar. 11, 1986 to Aschwanden each describe circuits using phase lock loops to produce the PAL sync signal using the video subcarrier frequency as a reference. However phase lock loop circuits do not lend themselves to integration on a single IC.

Another approach to the problem is to use a signal other than the video subcarrier as a reference. U.S. Pat. No. 4,169,659 issued Oct. 2, 1979 to Marlowe describes a sync generator that uses an oscillator to produce a reference signal having a frequency that is an even multiple of the PAL sync signal. However a horizontal synchronizing signal that is not locked to the subcarrier signal can cause picture disturbances in some applications.

Yet another approach to the problem, as taught in U.S. Pat. No. 5,282,020 issued Jan. 25, 1994 to Tanaka, is to frequency multiply the SC signal by four and then use a counter to divide the result by 1135. The 25 Hz offset is ignored until the last line of each field when it is accounted for by dividing the frequency multiplied SC signal by 1137 instead of 1135. The extra two cycles of the multiplied SC signal accounts for the 25 Hz offset. Although this approach accounts for the 25 Hz offset, only the sync signal pulse of each frame matches the PAL standard, the timing of the other sync signal pulses for each frame varies from the PAL standard. This can distort the image somewhat and can be problematic in applications where timing is critical.

What is needed is a digital integrated circuit that can generate a PAL standard horizontal sync signal using the PAL standard subcarrier signal frequency as a reference without resorting to phase locked loop technology.

SUMMARY OF THE INVENTION

A European Television Phase Alternate Line (PAL) standard video frame is 625 lines of 1135 pixels each. Each frame consists of two fields of 625/2 lines each. Pixel data defining each successive field is conveyed sequentially on a line by line basis by a video signal having a subcarrier SC of frequency $F_{SC}$. The present invention is a circuit for producing a periodic horizontal synchronizing (sync) signal H, each successive pulse of which signals the start of a next successive line of pixel data as it appears in the video signal. According to the PAL standard, the period $P_H$ of the horizontal sync signal should be related to the period $F_{SC}$ of the subcarrier signal as follows:

$$P_H = 1135 * P_{SC}/4 + (4/625) * P_{SC}/4.$$

The synchronizing signal generator of the present invention employs a frequency multiplier to produce a first reference signal REF1 having a period $P_{SC}/4$. A divide-by-N counter, having an N value that may be set to either 1135 or 1137, normally frequency divides the REF1 signal to produce a second reference signal REF2 having a period of $^{1135}*P_{REF1}$. If we let one unit delay (UNIT_DELAY) equal $(4/625)*P_{SC}/4$ then $$P_H = P_{REF2} + UNIT\_DELAY$$

Numbering the lines of a video field consecutively starting with n=0, we can see from the above equation that if the first pulse (pulse 0) of the horizontal sync signal H for the first line (n=0) of a field is in phase with a first pulse of the REF2 signal, then the second pulse of sync signal H for line n=1 will lag the second pulse of the REF2 signal by one unit delay. In general, the nth pulse of the sync signal H will lag the nth pulse of the REF2 signal by n unit delays.

Accordingly to produce a horizontal sync signal H pulse for the nth line of a video frame, the sync generator of the present invention employs a delay circuit to delay each nth pulse of the $P_{REF2}$ signal by n unit delays to produce each nth pulse of the horizontal sync signal.

Since a video frame is 625 lines, and since there are two fields per frame, the sync signal pulse for the first line of the second field would be delayed by 625/2 delay units, which is equivalent to 2 full cycles of the REF1 signal. This means that if the 0th pulse of the sync signal H signaling the start of a first video frame is in phase with the 0th pulse of the REF2 signal, the pulse signaling the start of the first line of next frame will lag a corresponding REF2 signal pulse by two full cycles of the REF1 signal. Thus, instead of using the delay circuit to delay the REF2 pulse for the first line of the next field by $2*P_{REF1}$, the sync generator temporarily increases the value of N for the divide-by-N counter from 1135 to 1137 when producing the REF2 pulse for the first line of the next field and resets the delay circuit to provide 0 delay. When this process is repeated for each successive field, the horizontal sync signal H will be consistent with the PAL standard.

It is accordingly an object of the invention to provide a circuit for generating a PAL standard horizontal sync signal using the PAL standard subcarrier signal as a timing reference.

It is another object of the invention to provide a circuit producing a PAL standard horizontal sync signal employing only digital components that are amenable to integration. provide a circuit for producing a PAL standard horizontal synchronizing signal using the PAL standard video subcarrier frequency as a timing reference.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

FIG. 1 is a block diagram of a horizontal synchronizing signal generator in accordance with the present invention, FIG. 2 is a block diagram of the incremental delay circuit of FIG. 1, FIG. 3 is a timing diagram illustrating timing relationships between signals produced by the circuits of FIG. 1 and 2, and FIG. 4 is a block diagram of an alternative embodiment of a synchronizing signal generator in accordance with the present invention.

DESCRIPTION OF THE PREFERRED EMBODIMENT(S)

A European Television Phase Alternate Line (PAL) standard video frame is 625 lines of 1135 pixels each. Each frame consists of two fields of 625/2 lines each. Pixel data defining each successive field is conveyed sequentially on a line by line basis by a video signal having a subcarrier SC of frequency $F_{SC}$. The present invention is a circuit for producing a periodic horizontal synchronizing (sync) signal H, each successive pulse of which signals the start of a next successive line of pixel data as it appears in the video signal. According to the PAL standard, the period $P_H$ of the horizontal sync signal should be related to the period $F_{SC}$ of the subcarrier signal as follows:

$$P_H=(1135+4/625)*P_{SC}/4. \quad [1]$$

Figure 1:
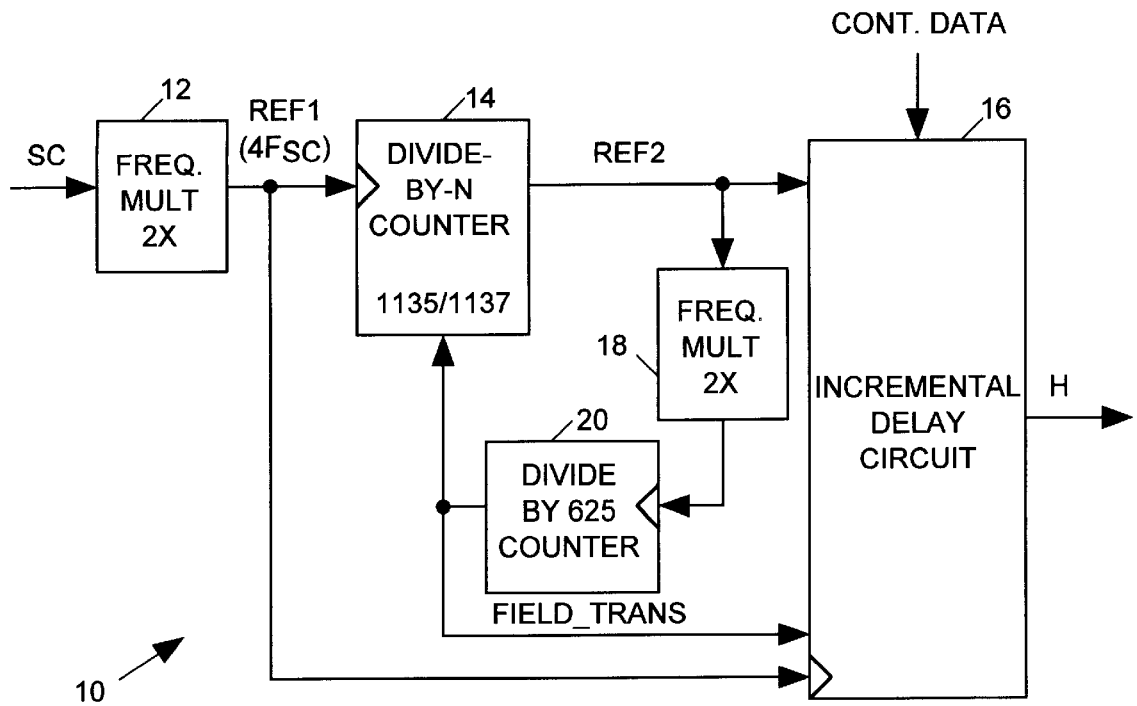

FIG. 1 illustrates a horizontal synchronizing signal generator 10 in accordance with the present invention for producing a horizontal sync signal H using the video subcarrier signal SC as a timing reference. The relationship between the period $P_H$ of the sync signal H and the period $P_{SC}$ of the subcarrier signal satisfies relation [1].

Synchronizing signal generator 10 employs a frequency multiplier 12 to produce a first reference signal REF1 having a period $P_{SC}/4$.

$$P_{REF1} =P_{SC}/4 \quad [2]$$

A divide-by-N counter 14, having a terminal count N that may be set to either 1135 or 1137 normally counts 1135 pulses of the REF1 signal to produce a second reference signal REF2 having a period of 1135* $P_{REF1}$ or $$P_{REF2}=1135*P_{SC}/4 \quad [3]$$

Substituting equations[2] and [3] into equation [1] we have:

$$P_H =P_{REF2}+(P_{REF1}) (4/625) \quad [4]$$

If we let one unit delay be equal to $(P_{REF1})$ (4/625) or $$UNIT\_DELAY=(P_{REF1}) (4/625) \quad [5]$$

then from [4] and [5] we have, $$P_H =P_{REF2}+UNIT\_DELAY. \quad [6]$$

Numbering the lines of a video field consecutively starting with n=0, we can deduce from equation [6] that if the first pulse (pulse 0) of the horizontal sync signal H for the first line (n=0) of a field is in phase with a first pulse of the REF2 signal, then the second pulse of sync signal H for line n=1 lags the second pulse of the REF2 signal by one unit delay. It follows that the nth pulse of the sync signal H lags the nth pulse of the REF2 signal by n unit delays. Accordingly, to produce a horizontal sync signal H pulse for the nth line of a video frame, the REF2 signal is applied as input to an incremental delay circuit 16. Using the high frequency REF1 signal as a timing reference, delay circuit 16 delays the nth pulse of the $P_{REF2}$ signal for each field by n unit delays to produce as output the nth pulse of the horizontal sync signal H. Thus after producing each horizontal sync pulse, delay circuit 16 increments its delay by one delay unit.

However delay circuit 16 does not continue to increment its delay indefinitely. Since a video frame is 625 lines, and since there are two fields per frame, the sync signal H pulse for the first line of the second field should be delayed by two full cycles of the REF1 signal $2P_{REF1}$ as we can determine from equation [5]. Thus if the 0th pulse of the sync signal H, which signals the start of a first video field is in phase with the 0th pulse of the REF2 signal, the sync signal H pulse signaling the start of the first line of next field should lag a corresponding REF2 signal pulse by two full cycles of the REF1 signal. However, instead of using delay circuit 16 to delay the REF2 pulse for the first line of the next field by 625/2 unit delays, the sync generator temporarily increases the value of N for divide-by-N counter 14 from 1135 to 1137 when producing the REF2 pulse for the first line of the next field and resets incremental delay circuit 16 to provide 0 delay. This process is repeated for each successive field.

To determine when to increase the value of N from 1135 to 1137, sync generator 10 employs a frequency multiplier 18 to double the frequency of REF2 and a divide-by-625 counter 20 to frequency divide the output of multiplier 18. Counter 20 asserts an output FIELD_TRANS signal pulse every 625/2 lines, thereby marking the transition between the end of each field and the start of the next. The output of counter 20 is supplied to a control input of counter 14. As mentioned above, counter 20 normally counts 1135 pulses of the REF1 signal for each pulse of its output REF2 signal. However, when counter 20 signals a transition between fields, counter 14 counts 1137 REF1 pulses before generating the next REF2 pulse. The FIELD_TRANS signal pulse also tells delay circuit 16 to reset its delay to 0.

Figure 2:
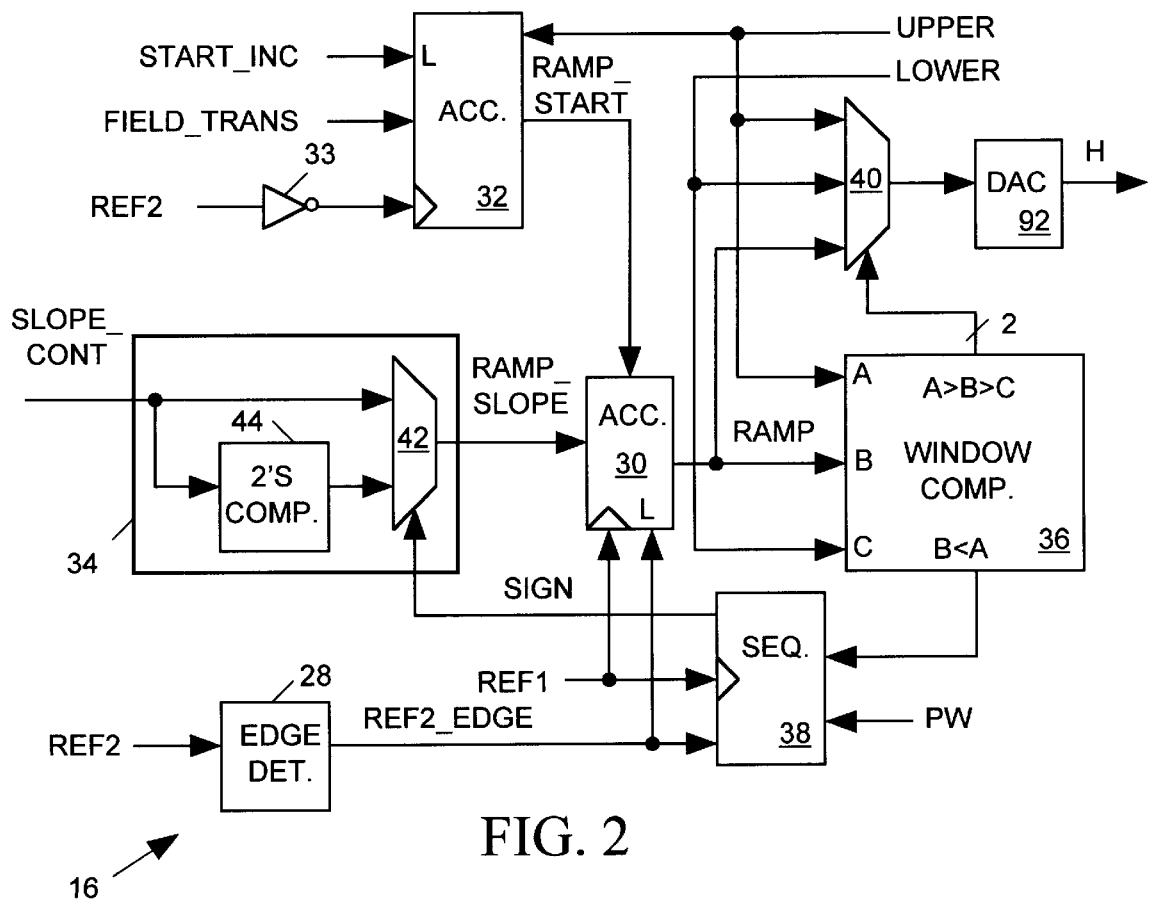
Figure 3:
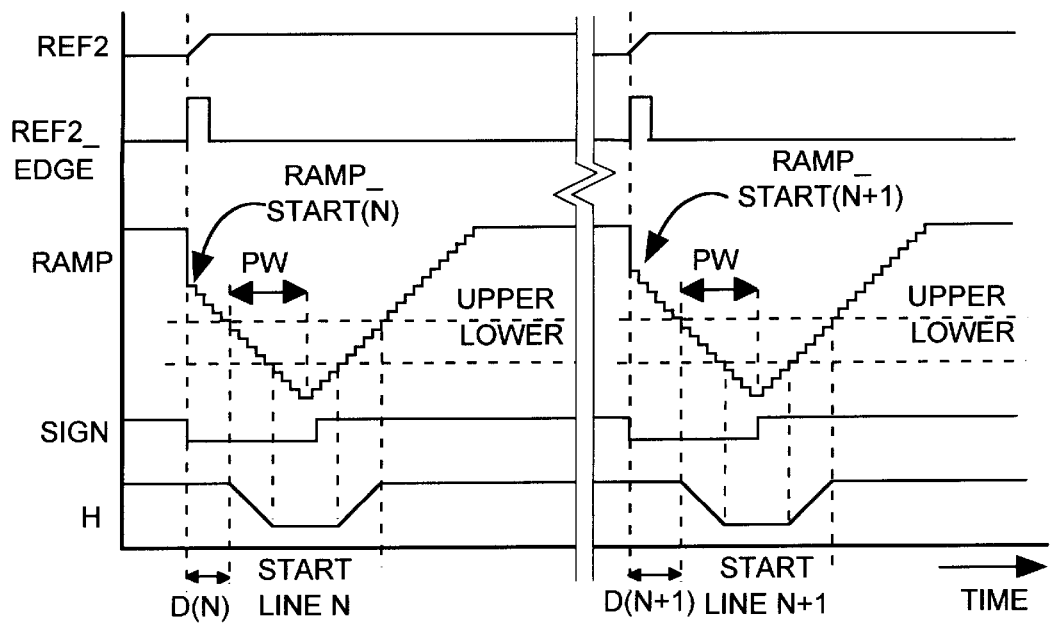

Thus at a transition between fields, the sync generator 10 delays the sync signal H pulse by delaying the generation of the REF2 pulse. While in the preferred embodiment of the invention, counter 14 delays generation of the REF2 pulse at each field transition by 2 cycles of the REF1 signal, one skilled in the art will understand that counter 14 could, for example, delay generation of the REF2 pulse by four cycles at frame transitions. In that case, frequency multiplier 18 could be omitted and delay circuit 16 would have continue increasing its delay up to four cycles of the REF1 signal FIG. 2 is a block diagram of incremental delay circuit 16 of FIG. 1. FIG. 3 is a timing diagram illustrating how delay circuit 16 of FIG. 2 works. Referring to FIGS. 2 and 3, delay circuit 16 includes an edge detector 28 that produces a short output pulse REF2_EDGE on the leading edge of each REF2 signal pulse. On each pulse of the REF2_EDGE signal an accumulator 30 loads an input RAMP_START signal, generated by another accumulator 32, and assigns the value of RAMP_START to its accumulated output value RAMP. Thereafter, on each pulse of the REF1 signal, accumulator 30 changes its output value RAMP by the amount of an input RAMP_SLOPE value produced by a ramp slope generator circuit 34. Since the RAMP_SLOPE value is initially a negative number, accumulator 30 decrements RAMP on each pulse of the REF1 signal. The RAMP data is applied to a "B" input of a window comparator 36. Constant threshold values UPPER and LOWER are supplied to A and C inputs, respectively, of window comparator 36. The RAMP, UPPER and LOWER data values are also supplied to separate inputs of a multiplexer 40 which delivers one of its inputs to a digital-to-analog converter 92. DAC 92 converts its input data to the analog horizontal synchronizing signal H. Window comparator 36 controls multiplexer 40. When the value of RAMP is higher than UPPER, window comparator 36 signals multiplexer 40 to select its UPPER data input. If the value of RAMP is between UPPER and LOWER, comparator 36 signals multiplexer 40 to select its RAMP data input. If the value of RAM is less than LOWER, multiplexer 40 signals DAC 92 to select its LOWER input.

Immediately following the REF2 edge pulse, the RAMP value at the B input of comparator 36 is greater than the UPPER value at its A input, so comparator 36 tells multiplexer 40 to pass its UPPER input to DAC 92. DAC 92 initially keeps H high, but with each pulse of the REF1 signal, accumulator 30 decrements the value of RAMP by the value of RAMP_SLOPE. At some point the value of RAMP falls below the value of UPPER and comparator 36 thereupon signals multiplexer 40 to deliver its RAMP input to DAC 92. Thereafter as RAMP continues to decline in value, H decreases. The RAMP data, being digital, decreases in a step-wise fashion, but capacitance within DAC 92 smoothes the edges of the H signal pulse. When RAMP falls below LOWER, window comparator 36 signals multiplexer to pass the LOWER data value to DAC 92, thereby causing DAC 92 to limit the fall of H.

The REF2_EDGE signal, in addition to resetting accumulator 30, also tells a sequencer 38 to drive its output signal SIGN low. Later, when the RAMP falls below UPPER, window comparator 36 signals sequencer 38. Sequencer 38 then waits for an additional number of pulses indicated by input data PW and then drives its output signal SIGN high. The SIGN signal tells RAMP_SLOPE generator 34 to reverse the sign of the RAMP_SLOPE data so that RAMP_SLOPE is now positive. Thereafter, on each successive pulse of the REF1 signal, accumulator 30 increments the RAMP data by the amount of its input RAMP_SLOPE data. When the value of RAMP rises above LOWER, comparator 36 signals multiplexer 40 to once again deliver its RAMP input to DAC 92 so that the DAC 92 output synchronizing signal H begins to rise at the same rate RAMP rises. When RAMP thereafter rises above UPPER, comparator 36 signals multiplexer 40 to select its UPPER input, thereby limiting the rise of the synchronizing signal H. The value of RAMP eventually rises to the maximum of accumulator 30 and remains there until reset to a new RAMP_START value by a next REF2_EDGE pulse.

Ramp slope generator 34 includes a multiplexer 42 having an input receiving a constant SLOPE_CONT data value. A 2's complement unit 44 negates the SLOPE_CONT data and supplies the result to a second input of multiplexer 42. When the SIGN signal from sequencer 38 is low, multiplexer 42 passes the negated version of SLOPE_CONT as the RAMP_SLOPE value to accumulator 30. When the SIGN signal is high multiplexer 42 passes the positive version of SLOPE_CONT as the RAMP_SLOPE signal to accumulator 30.

As may be seen from FIG. 3, the leading edge of the nth pulse of horizontal sync signal H lags the leading edge of the REF2 signal when RAMP_START is greater than UPPER. For fixed UPPER and SLOPE_CONT values, the amount of delay between those two signal edges depends on the RAMP_START value accumulator 32 supplies to accumulator 30 when the REF2_EDGE pulse reaches accumulator 30. The higher the value of RAMP_START, the longer the delay. Delay circuit 16 increases the RAMP_START data value after each successive REF2 pulse so that successive output horizontal sync signal H pulses are progressively delayed. Note in FIG. 3 that the delay time D(N+1) between the leading edge of pulse (N+1) of the REF3 signal and the leading edge of the H signal pulse N+1 is longer than the delay time D(n) between the leading edge of REF2 signal pulse N and H signal pulse N because RAMP_START(N+1) is greater than RAMP_START(N).

Accumulator 32 of FIG. 2, clocked by the REF2 inverted by an inverter 33, increments its output RAMP_START data value by the amount of an input START_INC constant on each trailing edge of the REF2 signal. The START_INC constant is sized so that the delay increment is one unit delay. At the field transition point, when counter 20 of FIG. 1 pulses the FIELD_TRANS signal, accumulator 32 of FIG. 2 resets the RAMP_START value to UPPER. On the next REF2_EDGE pulse, accumulator 30 sets RAMP to UPPER thereby resetting the delay of delay circuit 16 to 0. Accumulator 32 then periodically increases the RAMP value with each pulse of the REF2 signal until the next field transition.

The slope of the leading and trailing edges of the output horizontal synchronizing signal H, a seen in FIG. 3, is determined by the slope of the RAMP signal which is in turn set by the value of the SLOPE_CONT input data. The UPPER and LOWER data value directly control the high and low levels of the horizontal synchronizing signal H. Thus the value of control data input to delay circuit 16 can be selected to adjust the shape of the synchronizing signal pulses so that it matches application requirements.

Figure 4:
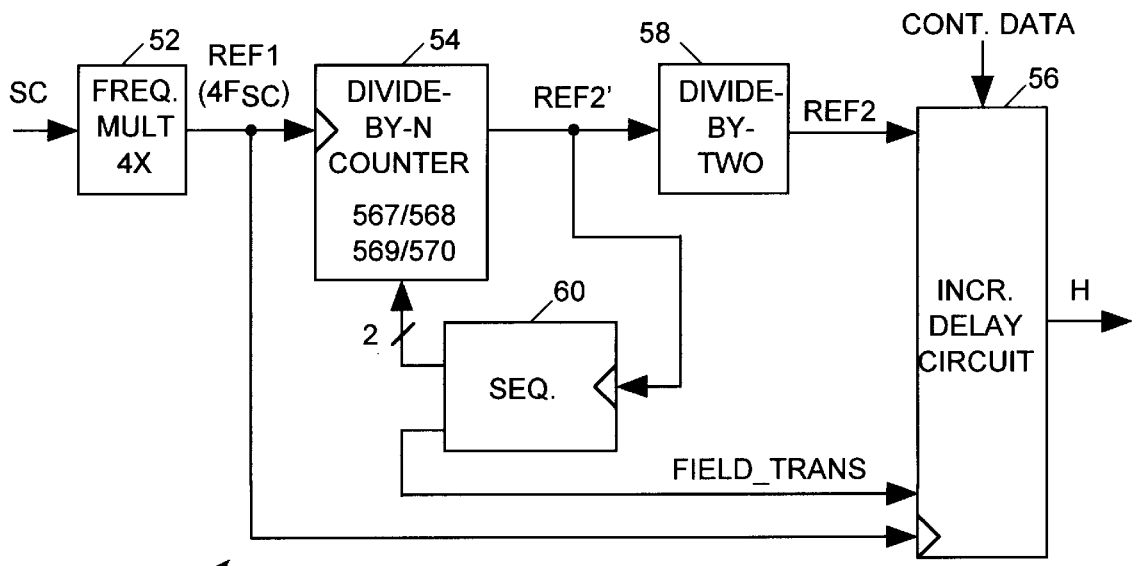

FIG. 4 illustrates an alternative embodiment 50 of the horizontal synchronizing signal generator 10 of FIG. 1. Synchronizing signal generator 50 of FIG. 4 includes a 4× frequency multiplier 52, similar to frequency multiplier 12 of FIG. 1, for producing a higher frequency REF1 signal. However divide-by-N counter 14 of FIG. 1 is replace by a divide-by_N counter having four modes of operation: where N can have values of 567, 568, 569 or 570. The output REF2' of divide-by-N counter, which signals the end of each "half line" of 1135 pixels, is frequency divided by a divide-by-two counter to produce a REF2 signal as input to an incremental delay circuit 56, similar to delay circuit 16 of FIG. 1. REF2' signal clocks a sequencer 60 having a 2-bit output for controlling the mode of counter 54.

For the first 312 full lines of the first field of each frame, sequencer 60 sets the value of N for counter 54 to 567 for the first half of each line and sets the value of N to 568 for the second half of each line. Thus each REF2 pulse, other than the last REF2 pulse for a field, occurs every of 1135 (567+568) REF1 pulses. The last REF2 pulse requires a total count of 1137 REF1 pulses. For the last half line of the first field, sequencer 50 sets counter 54 to count 569 pulses instead of 567. For each line of the second field of each frame, sequencer 60 sets N for counter 54 to 568 for the first half of each line and to 567 for the second half of each line. However for the last half of the last line of the second field of each frame, sequencer 50 sets N to 570. Sequencer 60 also generates the FIELD_TRANS signal supplied to delay circuit 56 to mark the end of each field.

Thus has been described a horizontal synchronizing signal generator 10 for producing a sync signal accurately matching the PAL standard using the PAL standard video carrier signal as a timing reference. All of the components of generator 10 can be implemented by digital circuits amenable to integration. While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A method for producing an output signal waveform formed by a periodic sequence of pulses having ramped edges, wherein the output signal waveform is produced in response to a periodic input pulse sequence, wherein said input pulse sequence and said output signal waveform are of differing frequencies, and wherein a shape of the output signal waveform frequencies is controlled by an input upper data value, an input lower data value, an input pulse width data value, an input start increment data value, and an input slope data value, the method comprising the steps of:

frequency dividing said input pulse sequence to produce a reference pulse sequence;

generating a ramp start data value that is higher than said upper data value but which progressively changes in magnitude in response to each successive reference pulse;

generating a ramp data value in response to each successive input pulse, the generated ramp data value being set to the generated ramp start data value following each successive reference pulse, the generated ramp data value being thereafter progressively decreased in response to each successive input pulse until the generated ramp data value reaches a lower limit below said lower data value, the generated ramp data value being thereafter progressively increased in response to each successive input pulse unit until the generated ramp data value reaches an upper limit above said upper data value; and generating said output signal waveform, wherein a magnitude of said output signal waveform is controlled by the generated ramp data value when the generated ramp data value is between said upper and lower data values, wherein the magnitude of said output signal waveform is controlled by said upper data value, when said ramp data value is above said upper data value, and wherein said magnitude of said output signal waveform is controlled by said lower data value when said ramp data value is below said lower data value.

2. The method in accordance with claim 1 wherein said input start increment data value controls an amount by which the ramp start data value progressively changes.

3. The method in accordance with claim 1 wherein said input slope data value controls amounts by which the ramp data value is progressively increased or decreased.

4. The method in accordance with claim 1 wherein said input pulse width data value indicates said lower limit by indicating a number of input pulses occurring between a time said ramp data value falls below one of said upper and lower data values and a time said ramp data value reaches said lower limit.

5. The method in accordance with claim 1 wherein a frequency of said reference pulse changes periodically between differing first and second frequencies.

6. The method in accordance with claim 5 wherein said ramp start data value changes to a predetermined level when said frequency of said reference pulse changes to said second frequency.

7. The method in accordance with claim 1 wherein said input start increment data value controls an amount by which the ramp start data value progressively changes, wherein said input slope data value controls amounts by which the ramp data value is progressively increased or decreased, and wherein said input pulse width data value indicates said lower limit by indicating a number of input pulses occurring between a time said ramp data value falls below one of said upper and lower data values and a time said ramp data value reaches said lower limit.

8. The method in accordance with claim 7 wherein a frequency of said reference pulse sequence changes periodically between differing first and second frequencies.

9. The method in accordance with claim 8 wherein said ramp start data value changes to a predetermined level when said frequency of said reference pulse sequence changes to said second frequency.

10. The method in accordance with claim 3 wherein a frequency of said input pulse sequence is other than an integer multiple of a frequency of said output signal waveform.

11. An apparatus for producing an output signal formed by a periodic sequence of output pulses having ramped edges in response to a periodic first sequence of input pulses, the apparatus comprising:

first means for frequency dividing said first sequence to produce a second sequence of reference pulses, second means for periodically generating a third sequence of progressively increasing ramp data values and for periodically generating a fourth sequence of progressively decreasing ramp data values, wherein successive ramp data values of said third and fourth sequences are generated in response to successive ones of said input pulses, and wherein said third and fourth sequences are generated during non-overlapping intervals following each of said reference pulses; and third means for generating said output signal in response to said third and fourth sequences.

12. The apparatus in accordance with claim 11 wherein successively generated fourth sequences have progressively higher starting ramp data values.

13. The apparatus in accordance with claim 11 wherein said second means comprises:

a first accumulator clocked by said second sequence and accumulating a first constant to produce a progressively increasing ramp start value, means for generating a ramp slope value alternating between a constant and its complement, a second accumulator, receiving said ramp start value and said ramp slope value, for providing said ramp start value as a first ramp data value of one of said third and fourth sequences in response to each successive reference pulse and for generating each successive ramp data values of said third and fourth sequences by adding the received ramp slope value to a preceding ramp data value.

14. The apparatus in accordance with claim 11 wherein said third means comprises:

a digital-to-analog converter (DAC) for generating said output signal in response to a sequence of input data representing a time-varying magnitude of said output signal, and means for routing said third and fourth data sequences from said second means to said DAC when ramp data values of said third and fourth sequences are within a predetermined range.

15. The apparatus in accordance with claim 12 wherein said second means comprises:

a first accumulator clocked by said second sequence and accumulating a first constant to produce a progressively increasing ramp start value, means for generating a ramp slope value alternating between a constant and its complement, a second accumulator, receiving said ramp start value and said ramp slope value, for providing said ramp start value as a first ramp data value of one of said third and fourth sequences in response to each successive reference pulse and for generating each successive ramp data values of said third and fourth sequences by adding the received ramp slope value to a preceding ramp data value.

16. The apparatus in accordance with claim 11 wherein the first means frequency divides said first sequence such that said second sequence has a frequency that periodically alternates between first and second frequencies.

* * * * *